(12) United States Patent
Telefus

(10) Patent No.: US 12,095,383 B2
(45) Date of Patent: Sep. 17, 2024

(54) AC TO DC CONVERTER

(71) Applicant: INTELESOL, LLC, Danville, CA (US)

(72) Inventor: Mark Telefus, Orinda, CA (US)

( * ) Notice: Subject to any disclaimer, the term of this patent is extended or adjusted under 35 U.S.C. 154(b) by 226 days.

(21) Appl. No.: 17/904,437

(22) PCT Filed: Jul. 21, 2020

(86) PCT No.: PCT/US2020/042896
§ 371 (c)(1),
(2) Date: Aug. 17, 2022

(87) PCT Pub. No.: WO2021/183172
PCT Pub. Date: Sep. 16, 2021

(65) Prior Publication Data
US 2023/0067227 A1  Mar. 2, 2023

Related U.S. Application Data

(60) Provisional application No. 62/987,045, filed on Mar. 9, 2020.

(51) Int. Cl.
*H02M 7/21* (2006.01)
*H02M 1/00* (2006.01)
*H02M 1/08* (2006.01)
*H02M 1/32* (2007.01)
*H02M 7/217* (2006.01)

(52) U.S. Cl.
CPC ......... *H02M 7/217* (2013.01); *H02M 1/0003* (2021.05); *H02M 1/08* (2013.01); *H02M 1/32* (2013.01)

(58) Field of Classification Search
CPC ...... H02M 7/217; H02M 1/0003; H02M 1/08; H02M 1/32
See application file for complete search history.

(56) References Cited

U.S. PATENT DOCUMENTS

| 4,074,345 A | 2/1978 | Ackermann |
| 4,127,895 A | 11/1978 | Krueger |
| 4,466,071 A | 8/1984 | Russell, Jr. |

(Continued)

OTHER PUBLICATIONS

Eguchi et al, Design of a Charge-Pump Type AC-DC Converter for RF-ID Tags, 2006 International Symposium on Communications and Information Technologies, F4D-3, IEEE (2006).

(Continued)

*Primary Examiner* — Rafael O De Leon Domenech
(74) *Attorney, Agent, or Firm* — Mark Wisnosky

(57) ABSTRACT

An AC to DC conversion system is described. The conversion system consists of an electronic switch and control circuitry employed to provide controlled pulsed power to a storage device that provides power to a load at either a preselected or manually or automatic selectable voltages while ensuring the voltage drop across the switch is minimized to reduce power dissipated through the switch itself, thereby significantly increasing the efficiency and reducing thermal losses. The AC to DC converter in one minimal version consists of a pair of N-MOSFET transistors, a voltage divider, a storage element and a pair of diodes. The design enables high efficiency with minimal components that may be fully integrated onto silicon.

14 Claims, 21 Drawing Sheets

(56) References Cited

U.S. PATENT DOCUMENTS

| | | |
|---|---|---|
| 4,581,540 A | 4/1986 | Guajardo |
| 4,631,625 A | 12/1986 | Alexander et al. |
| 4,760,293 A | 7/1988 | Hebenstreit |
| 4,812,995 A | 3/1989 | Girgis et al. |
| 5,121,282 A | 6/1992 | White |
| 5,371,646 A | 12/1994 | Biegelmeier |
| 5,654,880 A | 8/1997 | Brkovic et al. |
| 5,796,274 A | 8/1998 | Willis et al. |
| 5,933,305 A | 8/1999 | Schmaltz et al. |
| 6,081,123 A | 6/2000 | Kasbarian et al. |
| 6,111,494 A | 8/2000 | Fischer |
| 6,141,197 A | 10/2000 | Kim et al. |
| 6,169,391 B1 | 1/2001 | Lei |
| 6,188,203 B1 | 2/2001 | Rice et al. |
| 6,538,906 B1 | 3/2003 | Ke et al. |
| 6,813,720 B2 | 11/2004 | Leblanc |
| 6,839,208 B2 | 1/2005 | Macbeth et al. |
| 6,984,988 B2 | 1/2006 | Yamamoto |
| 7,053,626 B2 | 5/2006 | Monter et al. |
| 7,110,225 B1 | 9/2006 | Hick |
| 7,164,238 B2 | 1/2007 | Kazanov |
| 7,319,574 B2 | 1/2008 | Engel |
| 7,586,285 B2 | 9/2009 | Gunji |
| 7,693,670 B2 | 4/2010 | Durling et al. |
| 7,729,147 B1 | 6/2010 | Wong et al. |
| 7,746,677 B2 | 6/2010 | Unkrich |
| 7,948,719 B2 | 5/2011 | Ku |
| 8,374,729 B2 | 2/2013 | Chapel et al. |
| 8,463,453 B2 | 6/2013 | Parsons, Jr. |
| 8,560,134 B1 | 10/2013 | Lee |
| 8,717,720 B2 | 5/2014 | Deboer |
| 8,817,441 B2 | 8/2014 | Callanan |
| 8,947,838 B2 | 2/2015 | Yamai et al. |
| 9,287,792 B2 | 3/2016 | Telefus et al. |
| 9,577,420 B2 | 2/2017 | Ostrovsky et al. |
| 9,621,053 B1 | 4/2017 | Telefus |
| 11,170,964 B2 * | 11/2021 | Telefus ................ H01H 33/593 |
| 2004/0032756 A1 | 2/2004 | Van Den Bossche |
| 2008/0180866 A1 | 7/2008 | Wong |
| 2008/0204950 A1 | 8/2008 | Zhou et al. |
| 2009/0168273 A1 | 7/2009 | Yu et al. |
| 2009/0213629 A1 | 8/2009 | Liu et al. |
| 2010/0091418 A1 | 4/2010 | Xu |
| 2010/0155369 A1 | 6/2010 | Kularatna et al. |
| 2010/0320840 A1 | 12/2010 | Fridberg |
| 2011/0156610 A1 | 6/2011 | Ostrovsky et al. |
| 2011/0292703 A1 | 12/2011 | Cuk |
| 2011/0301894 A1 | 12/2011 | Sanderford |
| 2012/0026632 A1 | 2/2012 | Acharya et al. |
| 2012/0089266 A1 | 4/2012 | Tomimbang et al. |
| 2014/0085940 A1 | 3/2014 | Lee et al. |
| 2017/0105265 A1 | 4/2017 | Sadwick |
| 2019/0280887 A1 | 9/2019 | Telefus et al. |
| 2020/0014301 A1 * | 1/2020 | Telefus ................ G11C 27/024 |
| 2020/0044883 A1 | 2/2020 | Telefus et al. |

OTHER PUBLICATIONS

Park, Jeong-Eon, et al, Design on Topologies for High Efficiency Two-Stage AC-DC Converter, 2012 IEEE 7th International Power Electronics and Motion Control Conference—ECCE Asia Jun. 2-5, 2012, Harbin, China, p. 257.

Cuk, Slobodan, 98% Efficient Single-Stage AC/DC Converter Topologies, Power Electronics Europe, Issue 4, 2011, www.power-mag. com; p. 16.

* cited by examiner

AC TO DC CONVERTER

CROSS-REFERENCE TO RELATED APPLICATIONS

This application claims priority to U.S. Provisional application 62/987,045, Titled: Zero Voltage Switching AC Direct Power Regulator and Discriminator, Filed Mar. 9, 2020. Both applications include a common inventor and are currently pending.

STATEMENT REGARDING FEDERALLY SPONSORED RESEARCH OR DEVELOPMENT

Not Applicable.

BACKGROUND OF THE INVENTION

Technical Field

The invention relates to a power management system and methods to provide low voltage DC current from AC mains at very high efficiency.

Related Background Art

The traditional means for providing DC power from a primary AC supply (mains) was through analog circuitry that included a step-down transformer, a diode rectifier, and a filter comprising an electrolytic capacitor and resistor. The output voltage depended primarily on the turns ratio of the transformer and the circuit was moderately efficient. However, the size and weight of the magnetic structure required to implement the low frequency transformer obviates the use of this approach in miniature equipment.

A later approach that does not use a transformer involves the direct rectification of the AC mains, which rectified waveform is directly applied to a voltage regulation circuit comprising an active solid-state device in either a series or shunt connection. The shunt regulator configuration works by providing a current path across the rectified mains output through a variable resistance device, thereby diverting current away from the load. In the simplest implementation of the shunt regulator, a Zener diode is connected in shunt with the load with a resistor in series with this shunt leg. Any rectifier output voltage in excess of the Zener voltage is dropped across the resistor resulting in the excess power being dissipated as heat. Thus, this regulator configuration is very inefficient. Since the Zener current must be larger than the load current to maintain regulation through the Zener effect, the efficiency of this regulator circuit is much smaller than the ratio of the output voltage to the rms value of the rectified supply voltage.

An improved approach uses a series connected solid-state device, such as a bipolar or field-effect transistor, to buffer the Zener voltage reference. The active device is connected in a source-follower or emitter-follower configuration, with the load connected at the source or emitter and the Zener reference connected at the gate or base. The Zener current can be much smaller than in the shunt configuration, so the total current is largely that supplied to the load. Thus, the efficiency of this circuit is generally no better than the ratio of the input to output voltage.

A further improvement to this circuit function is termed a switch mode power supply. There are numerous such designs known in the art, but the commonality is an input rectifier, a switching element that operates at high speeds to switch a storage element, inductor or capacitor, into and out of the supply. If isolation of the input and output is required a high speed transformer can be introduced, both for isolation and to regulate the output voltage. RC filters are included to reduce ripple in the output. Switch mode power supplies have the advantage of increased efficiency since the power loss mechanisms of the early linear systems are largely eliminated. However, transformer losses can result in reduced efficiency if isolation is required. Also, the high speed switching is a source of considerable RF noise and introduces larger losses in conductors due to skin effects. Theoretically high efficiencies can and have been obtained in specially designed systems. Efficiencies as high as 95% are reported, but actual efficiencies are more typically 60% to 70% in low cost isolated systems.

A disadvantage of all heretofore known systems is that they cannot be easily integrated. Except for restricted special applications, the designs for present AC to DC converters cannot be integrated on a chip with other system functions. The power dissipated in individual circuit elements is too large for system-on-a-chip levels of integration. Components such as the types of transformers required are simply not available for integration on silicon.

Ubiquitous electronics devices and subsystems typically operate at 3.3 or 5 volts. The requirement to convert 120 or 240 volts AC mains to these low operating voltages taxes the efficiency of the heretofore available power converters. For both linear and switched power supplies the greater the difference between the input and output voltages the greater the inefficiency. There is a need for a high efficiency and low voltage power supply to supply power to the myriads of low power, low voltage consumer devices. Electronics proliferate in "smart" cars and "smart" homes. There is a need for small, efficient power supplies that can support always-on sensors and networks. More and more homes, factories and office buildings, including both new construction and retrofitting, are incorporating electronic sensors to control all uses of power for increased efficiency. There is a need for a low voltage, integrated, high efficiency power supply to support both new construction and retrofitting the power grid existing in homes, factories and office buildings. The power supply must be able to be integrated into the sensor and control electronics to enable such devices to physically fit within the confines of plugs and outlets used to supply local power. There is a need for high efficiency to avoid heat dissipation within the confines of the walls and power grids of homes, offices and factories. There is a need for power converters that have efficiencies in the range of 99 to 100%. There is a need for compact power converters that can fit within a wide range of devices rather than existing as bulky boxes external to the devices. There is a need for power converters that can be integrated.

SUMMARY OF THE INVENTION

An AC to DC power conversion system is described. The system and related devices address the need for a compact, integrated, low cost design, that is highly efficient and provides access to the low voltages used to drive typical silicon based electronic devices used in home sensors and networking, smart cars, etc. In one embodiment, the system includes an efficient electronic switch employed to disconnect the input of a series voltage regulator circuit from a rectified AC mains power supply to reduce the power dissipated within the series regulator. To optimize efficiency the voltage across the open switch is minimized as the switch is closed and energy is accumulated and stored in a shunt energy storage element. The electronic switch is opened when the rectified AC mains waveform exceeds a threshold value. While the switch is open, energy is supplied to the load by the energy storage element through the regulator circuit. In this way the benefits of the regulator circuit accrue to the attached load circuitry while the power dissipated within the regulator circuit is greatly reduced compared to the prior art. In another embodiment, the rectifier is eliminated and the switch is synchronized with one half-cycle of the AC mains waveform.

A comparator is used to control the electronic switch. In one embodiment the comparator is comprised of an operational amplifier and a reference voltage source. In another embodiment the comparator is comprised of a MOS field effect transistor. In one embodiment the MOS field effect transistor is controlled through a voltage divider. In another embodiment the voltage divider is replaced with a reference voltage source. In other embodiment the reference voltage is adjustable.

The specific examples are not intended to limit the inventive concept to the example application. Other aspects and advantages of the invention will be apparent from the accompanying drawings and detailed description.

DETAILED DESCRIPTION OF THE INVENTION

Figure 1:
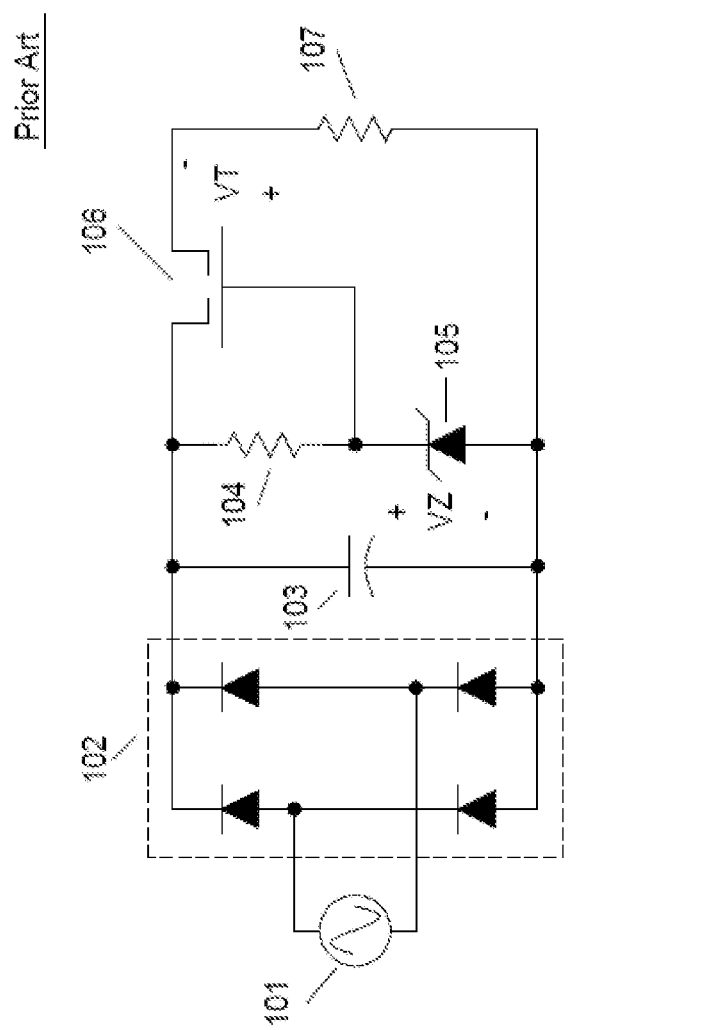
FIG. 1 is a schematic diagram of a prior art AC-DC converter.

FIG. 1 shows a schematic diagram of a prior art AC-DC converter circuit. The single-phase AC mains waveform 101 is sinusoidal and is full-wave rectified by diode bridge 102 and the resulting time-varying DC voltage waveform is smoothed by capacitor 103, typically an electrolytic capacitor. Note that there is no control for the charging of this capacitor 103. The rectified line voltage is applied to this capacitor, therefore a capacitor having a large capacitance value and a voltage rating greater than the peak value of the rectified AC mains waveform is required. The smoothed voltage waveform is applied to the input of a series regulator circuit including bias resistor 104, Zener diode 105 having a characteristic Zener voltage $V_Z$, and pass transistor 106, here represented as an enhancement mode MOS field-effect transistor (MOSFET) having a characteristic threshold voltage, $V_T$. The regulator output is applied to the load 107.

In operation, the pass transistor 106 dynamically adjusts its drain-source voltage to keep the load voltage at $V_Z$-$V_T$. In other words, pass transistor 106 forms a source-follower circuit that buffers the Zener voltage, $V_Z$. Since the full load current passes through pass transistor 106 and assuming that the Zener bias current is negligible, the efficiency of this regulator circuit is simply the ratio of the load voltage to the rms value of the supply voltage. Thus, if the desired load voltage is nominally 3.3V and the supply voltage is 120V rms, then the efficiency is less than 3%. Furthermore, if the load requires only a few tens of milliamperes of current, then pass transistor 106 must continuously dissipate several watts of power as heat. This amount of dissipation typically leads to an unacceptable temperature rise in miniature, enclosed equipment.

Figure 2:
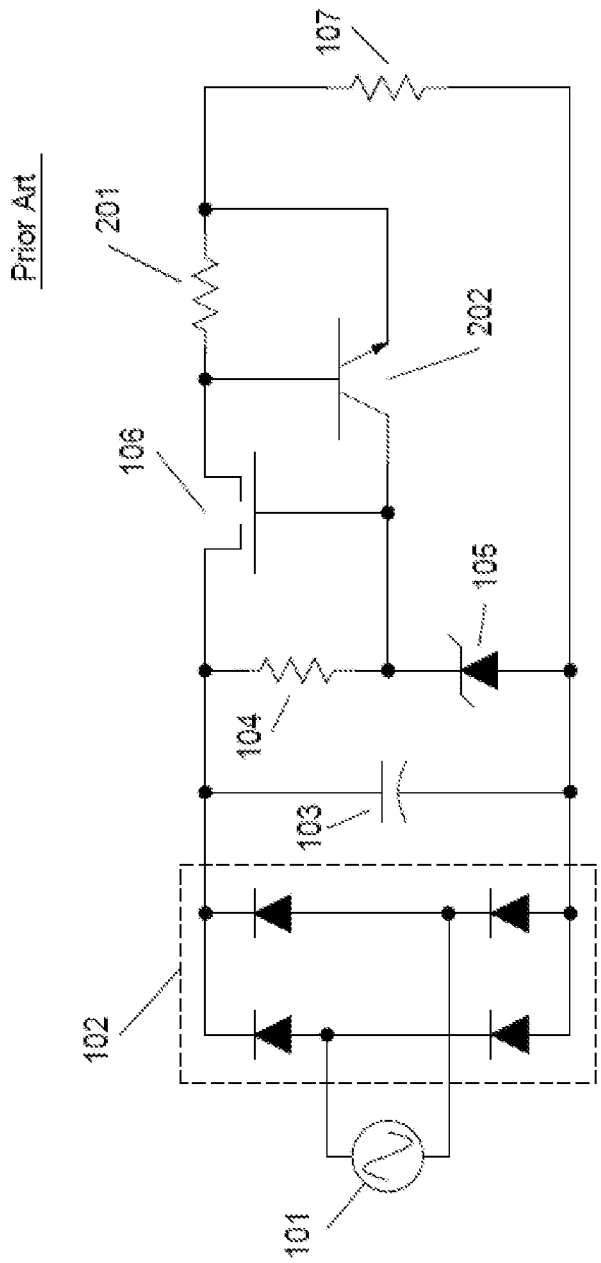
FIG. 2 is a schematic diagram of a prior art AC-DC converter with current limiting.

A further limitation of the circuit of FIG. 1 is that it provides no protection against output current transients that could damage pass transistor 106. Such transients could occur as a result of accidental shorting of the output terminals during operation or testing, or as a result of capacitive load impedance components. FIG. 2 shows a schematic diagram of a prior art AC-DC converter that includes additional components to limit the output current, thereby protecting the pass transistor 106. In FIG. 2 a current sensing resistor 201 having a small resistance value is placed in series with the load, and current limiting bipolar transistor 202 is connected between the gate of the pass transistor 106 and the load forming a protective current limiter circuit. Now if the voltage drop across resistor 201 exceeds approximately 0.7V (for silicon bipolar transistors) then transistor 202 begins to conduct which reduces the gate-source bias on pass transistor 106, thereby reducing the output current. However, the efficiency of this improved circuit is essentially unchanged compared to that of the circuit shown in FIG. 1.

Figure 3A:
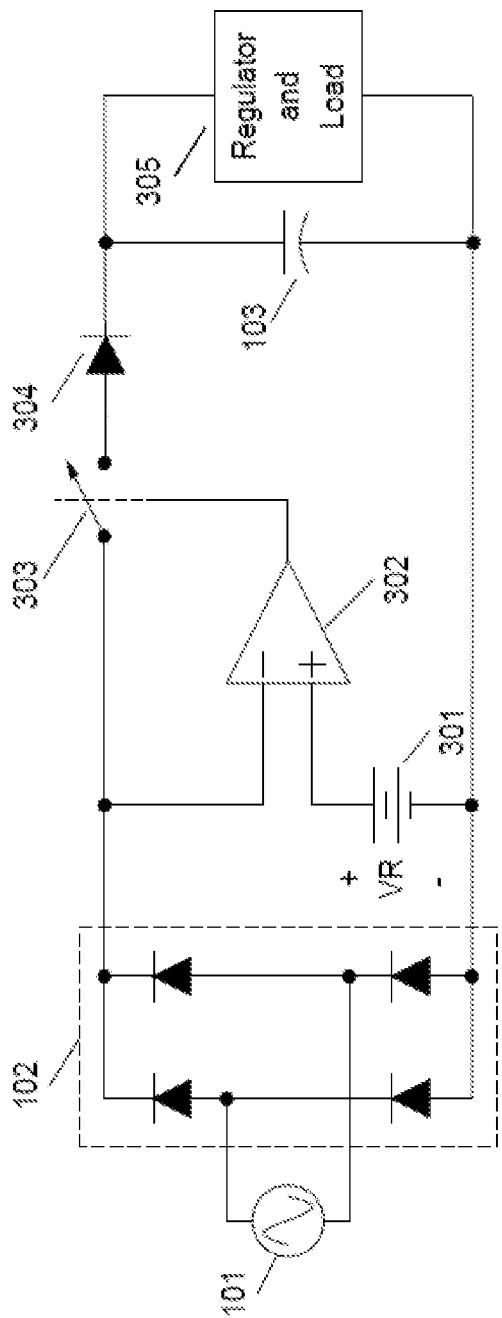
FIG. 3A is a schematic diagram showing the functions in an improved circuit.

In order to improve the efficiency of these prior art series regulator circuits, the power dissipated in the pass transistor must be significantly reduced. In one embodiment of the present invention, the pass transistor is disconnected from the rectified supply voltage when it is not needed. FIG. 3A shows a schematic diagram of an improved rectifier circuit that includes the AC mains 101, the diode bridge 102 and filter capacitor 103, but having additional circuitry inserted between the diode bridge 102 output and the filter capacitor 103. The waveform at the diode bridge 102 output is simply a full-wave rectified sinusoidal waveform that conventionally varies from 0V to approximately 170V peak for a conventional AC mains having an rms value of 120V. Note, however, that the method described below applies to any periodic power waveform assuming that the numeric specifications of the affected components are suitably adjusted. Additionally, the power waveform can include a DC offset if it is smaller than the reference voltage described below.

The additional circuitry includes a comparator circuit 302 having its inverting input connected to the diode bridge 102 output and a voltage reference 301 connected to its non-inverting input, wherein the comparator 302 controls a series switch 303 that disconnects the diode bridge output from succeeding circuitry (opens switch 303) if the diode bridge output voltage exceeds the reference voltage VR. On the other hand, when the reference voltage VR exceeds the diode bridge output voltage then switch 303 is closed and capacitor 103 is charged through series diode 304. Diode 304 keeps capacitor 103 from discharging back through switch 303 when the diode bridge output voltage decreases. The combination of diode 304 and capacitor 103 form a "peak detector" circuit that stores energy in each one-half of an AC mains cycle to supply to subsequent regulator circuitry and the load 305. Unlike the other prior art examples, the voltage across capacitor 103 need only be large enough to satisfy the energy requirement of the subsequent regulator circuitry and load 305. The input voltage to the series regulator is significantly reduced compared to the rms value of the AC mains. The operation of the "peak detector" circuit ensures the peak voltage stored on capacitor 103 is always VR, regardless of fluctuations in the peak voltage of the AC mains, as long as the voltage of the AC mains remains larger than VR. This embodiment of a switching circuit operates as a voltage regulator circuit itself. Since the operation of switch 303 uses negligible energy, the efficiency of the overall improved AC-DC converter circuit shown in FIG. 3A is much larger than seen for the prior art circuits of FIGS. 1 and 2. An additional benefit is a significant reduction in operating temperature rise. Although the comparator 302 is a well-known analog circuit element other analog or digital circuits could be employed to accomplish the desired thresholding function needed to operate switch 303. In one embodiment the reference voltage VR is fixed. In another embodiment, the reference voltage can be varied. In another embodiment the reference voltage is selectable. In one embodiment the circuit of FIG. 3A is connected to the load and the regulator aspect of the circuit is used to control voltage supplied to the load. In another embodiment an additional regulator is used in series with the circuit of FIG. 3A and the load.

Figure 3B:
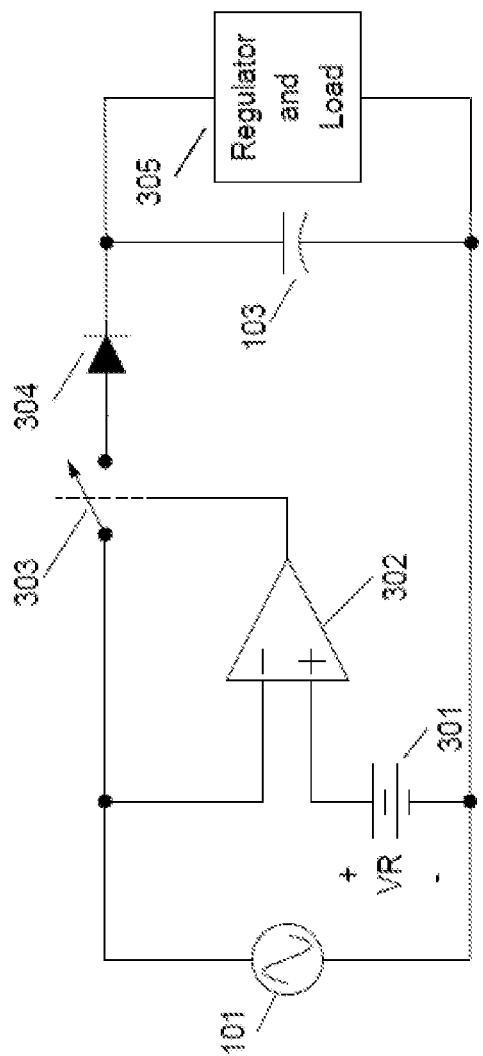
FIG. 3B is a schematic diagram showing the circuit of FIG. 3A without a full-wave rectifier

As noted above, the operation of this circuit does not depend on the availability of a full-wave rectified AC mains waveform. In fact, assuming that the specifications of elements 301-305 are adequate to handle the negative excursion of the AC mains waveform, the diode bridge 102 can be eliminated and the switching and regulation components can be connected directly to the AC mains resulting in the embodiment shown in FIG. 3B. Note that peak detector diode 304 also blocks reverse current through the load during the negative half cycle of the AC mains when switch 303 will be closed. The only disadvantage of this embodiment relative to that illustrated in FIG. 3A is that the total maximum power available to the load is halved.

Figure 4:
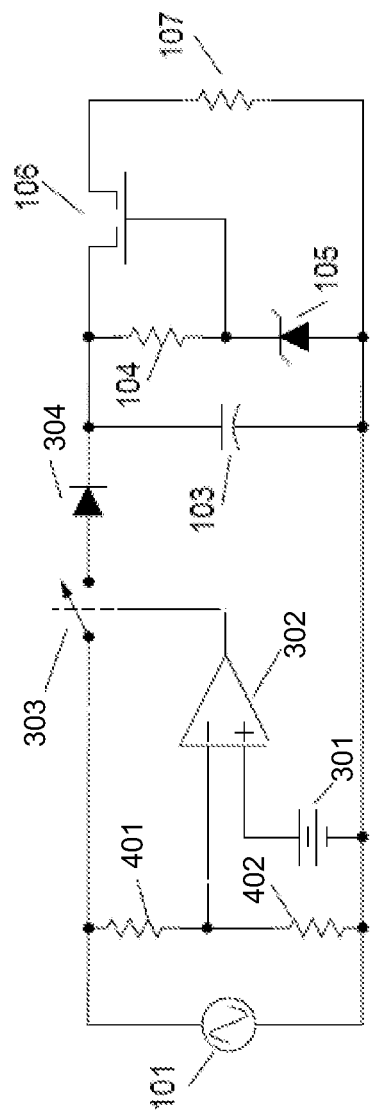
FIG. 4 is a schematic diagram showing an improved AC-DC converter.

FIG. 4 shows a schematic diagram of an improved rectifier circuit interconnected to the series regulator 103, 104, 105, 106 and load 107 and provides a convenient basis for establishing the relationships among design variables in the new rectifier circuits to be described below. Voltage to the comparator is through divider network of resistors 401, 402. The comparator 301-304 is as already described. To maintain regulation of the output voltage, the voltage across capacitor 103 must exceed the Zener 105 voltage, $V_Z$. However, capacitor 103 will discharge linearly in time over a half period of the AC mains due to the nominally constant current provided to the load 107. Thus, capacitor 103 must initially be charged to a peak voltage $V_{peak}=V_Z+I_{load}*t_{MAINS}/(2*C103)$, where $t_{MAINS}$ is the period of the AC mains waveform. This gives the value of capacitor 103 as a function of the difference between $V_{peak}$ and $V_Z$. Higher values of $V_{peak}$ also result in higher power dissipation in pass transistor 106, and this can be traded against the maximum practical value of capacitor 103. The efficiency of the regulator is the ratio of the power delivered to the load divided by the total power dissipated in the circuit and is given by $2*(V_Z-V_T)/(V_Z+V_{peak})$. Since the minimum value of $V_{peak}$ is $V_Z$, the best case efficiency is simply $1-V_T/V_Z$.

Figure 5:
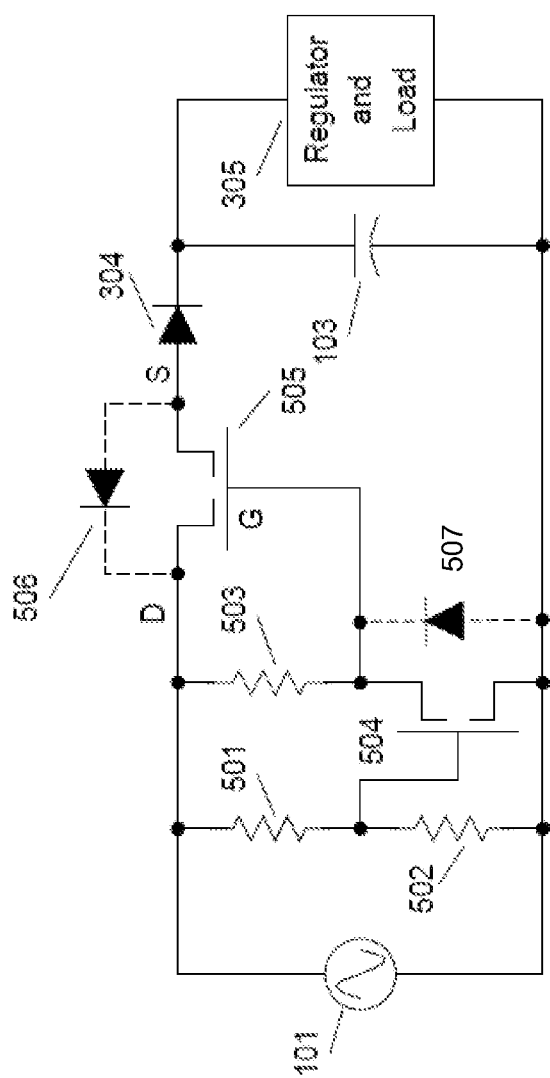
FIG. 5 is a schematic diagram of an embodiment of the improved circuit in FIG. 4 using MOS field-effect transistors.

FIG. 5 shows a schematic diagram of the improved rectifier circuit wherein the switch 303 is implemented using an enhancement mode MOSFET 505 and the comparator circuit is realized as a single common-source amplifier stage also using an enhancement mode MOSFET 504 characterized by a threshold voltage, $V_{T1}$, and a load resistor 503. Thus, when the output of the voltage divider network comprising resistors 501 and 502 exceeds the threshold voltage of MOSFET 504, $V_{T1}$, the gate of MOSFET switch 505 is pulled to ground thereby opening switch 505. When the output of the voltage divider network 501, 502 is smaller than $V_{T1}$ the gate of MOSFET 505 is connected to its drain, thereby closing the switch. However, MOSFET 505 is not an ideal switch, and significant power dissipation may be experienced while it is in its conducting state, so that the efficiency of the circuit realized using MOSFETs will not be as great as that obtained in the ideal case shown in FIG. 4. The efficiency issue derives from the fact that as the drain and gate voltages of MOSFET 505 increase on the positive half cycle of source 101, drain current Id(t) flows from drain to source when the gate voltage exceeds the source voltage by MOSFET 505's threshold voltage, $V_{T2}$, and the source voltage of MOSFET 505 rises to within its threshold voltage, $V_{T2}$, of the gate voltage. The drain current ceases when MOSFET 505 is turned off by MOSFET 504. Thus, the drain-source voltage of MOSFET 505 during the charging current transient is also approximately its threshold voltage, $V_{T2}$, which is normally around 4-6 volts for power FETs.

Consequently, the instantaneous power dissipated in the MOSFET 505 during the charging current transient is simply Id(t)*V$_{T2}$, which can be appreciable compared to the power delivered to the load by the same current transient.

Additionally, as a result of their fabrication process, power MOSFETs typically include a parasitic source-to-drain diode 506 associated with MOSFET 505, and, parasitic source-to-drain diode 507 associated with MOSFET 504. Note that diode 506 could allow capacitor 103 to discharge when MOSFET 505 is "off", but series track and hold diode 304 blocks this spurious discharge path. The existence of the parasitic diodes 506 and 507 is assumed in subsequent diagrams. In one embodiment, all of the components of FIG. 5 are fabricated on a single semiconductor chip. In another embodiment all of the components of FIG. 5, except for capacitor 103 are fabricated on a single semiconductor chip.

Figure 6:
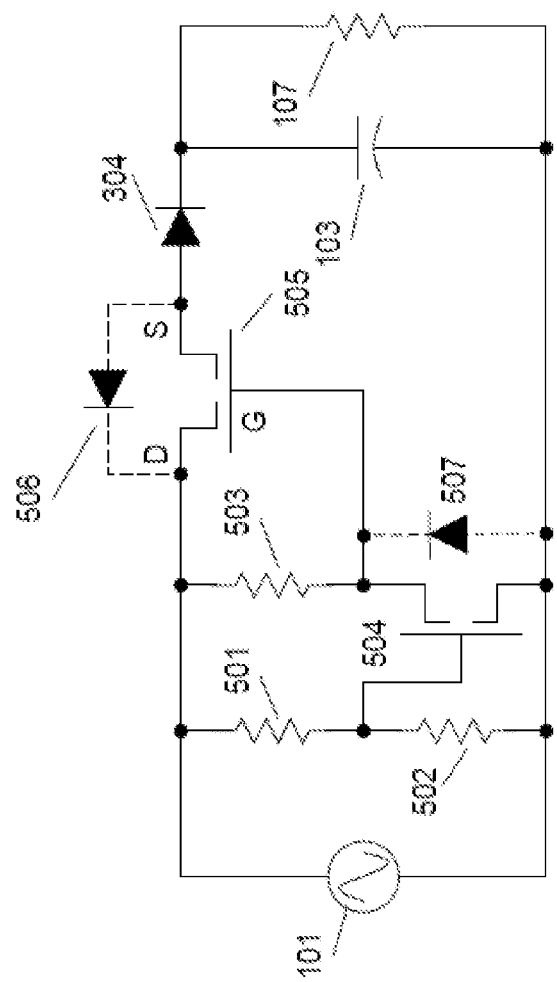
FIG. 6 is a schematic diagram of a simplified version of FIG. 5.
Figure 7:
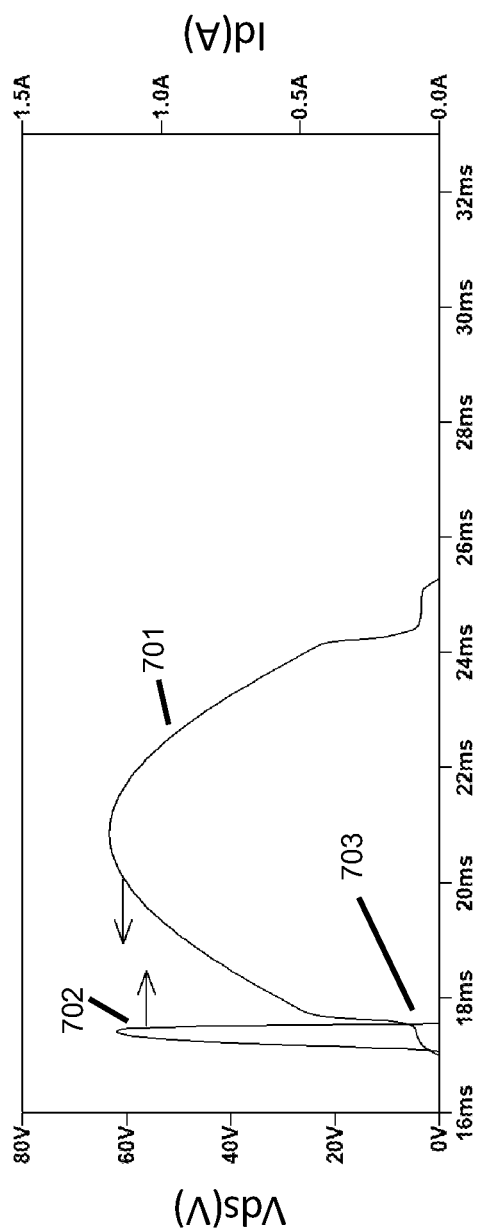
FIG. 7 shows drain-to-source voltage and drain current waveforms for the MOSFET switch in FIG. 6 produced by a circuit simulation program.

FIG. 6 is the schematic diagram of a simplified version of the improved rectifier circuit of FIG. 5 for circuit simulation to provide a basis for comparison of efficiencies of the preferred embodiment higher efficiency circuits to be described below. For simplicity the voltage regulation circuitry is omitted and the load is represented by a resistor 107. The results of SPICE simulation of the circuit of FIG. 6 assuming a 60 Hz AC mains frequency appear in FIG. 7 which shows the waveforms of the drain-source voltage 701, Vds, and drain current 702, Id, of switch MOSFET 505 over one cycle of the AC mains 101. Note the pedestal 703 having an amplitude of approximately V$_{T2}$, the threshold voltage of MOSFET 505, on the Vds waveform 701 coincident with the drain current transient. Efficiency is the ratio of the average power delivered to load 107: (Id*Vload) divided by the average power delivered to the switching circuit by the AC mains (Id*VAC) and is 68%. Fully 30% of the power supplied by the AC mains is dissipated in switch MOSFET 505.

Figure 8:
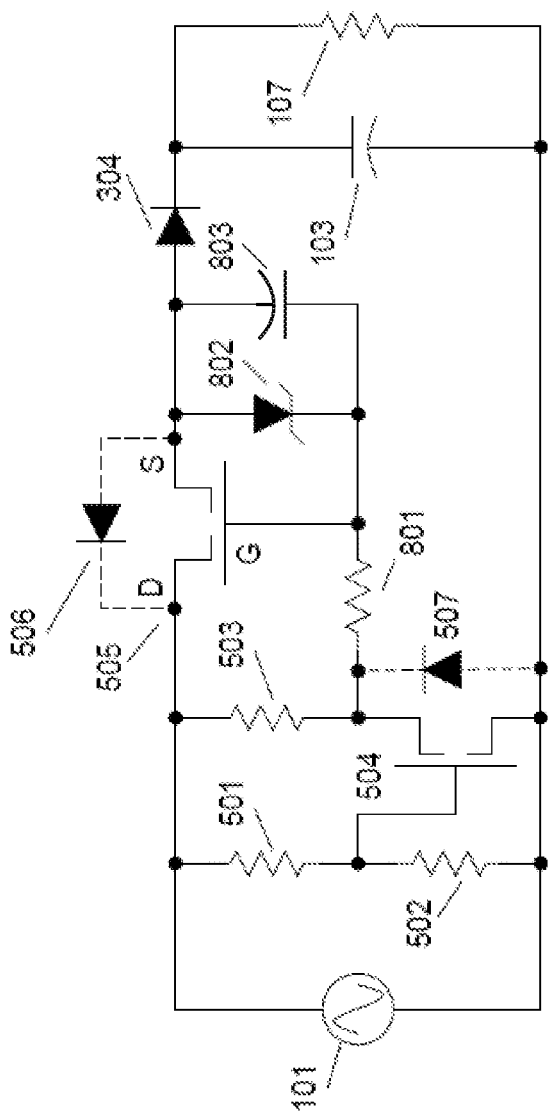
FIG. 8 is a schematic diagram of an embodiment of the zero voltage switching circuit using MOS field-effect transistors.
Figure 9:
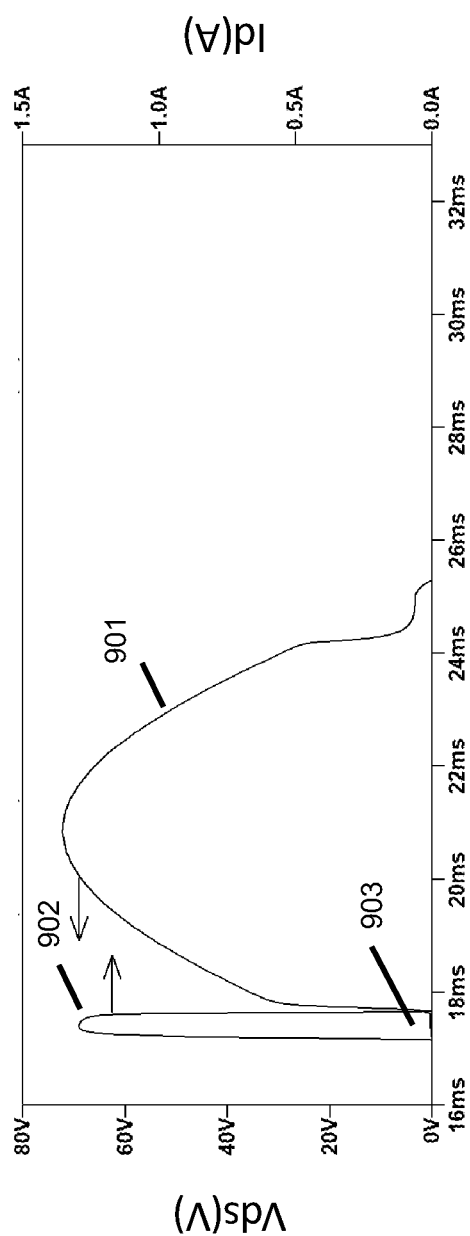
FIG. 9 shows drain-to-source voltage and drain current waveforms for the MOSFET switch in FIG. 8 produced by a circuit simulation program.

To overcome this V$_{T2}$ "overhead", the higher efficiency circuit of FIG. 8 includes current limiting resistor 801 and Zener diode 802 shunted by capacitor 803 connected between the gate and source of MOSFET 505. During the negative half cycle of source 101 current flows from ground, through the body diode 507 of MOSFET 504, through the added components 801-803 and back to 101 through the body diode 506 of MOSFET 505, resulting in the Zener voltage V$_Z$ of diode 802 being stored on capacitor 803. Note that this stored voltage applies a positive bias on the gate of 505 relative to its source equal to V$_Z$, which can be greater than V$_{T2}$. Thus, when MOSFET 505 comes back on at the start of the positive half cycle of 101, its drain-source voltage can be much smaller than V$_{T2}$, limited only by the intrinsic channel resistance, rds, of MOSFET 505, which is typically much less than one ohm. The results of SPICE simulation of this "zero voltage" switching circuit appear in FIG. 9, again showing the waveforms of the drain-source voltage 901, Vds, and drain current 902, Id, of MOSFET 505 over one cycle of the AC mains. Note that the Vds waveform is nearly zero during the drain current transient 903. The efficiency of this circuit is 89% and less than 2% of the power supplied by the AC mains is dissipated in MOSFET 505.

Since the precharging of capacitor 803 to the Zener voltage of diode 802 on the negative half-cycle of the AC mains provides gate bias for MOSFET 505, resistor 503 is no longer needed to provide it. Another embodiment of the zero voltage switching circuit, shown in FIG. 10, eliminates the load resistor (item 503 of FIG. 8) in the drain circuit of MOSFET 504 which also provides a parasitic discharge path for capacitor 803 through MOSFET 505 that limits the duration of the drain current transient in the circuit of FIG. 8. Additionally, bias resistor 501 is disconnected from AC mains 101 and is connected directly to the DC output node at the junction of diode 304, load resistor 107 and capacitor 103. Thus, MOSFET 504 conducts, turning switch MOSFET 505 off when the DC output node voltage reaches a threshold value established by resistors 501 and 502 and the threshold voltage of MOSFET 504. The results of SPICE simulation of this circuit appear in in FIG. 11A and FIG. 11B. FIG. 11A shows the three initial cycles 1100 of the AC mains 101, Vac, at circuit startup and the drain current 1102, Id, of MOSFET 505 and shows that the drain current transient 1102 reaches steady state after the first negative half cycle of the AC mains 1100. FIG. 11B again shows the waveforms of the drain-source voltage 1101, Vds, and drain current 1102, Id, of MOSFET 505 over one cycle of the AC mains in the steady state. Because of the larger drain current transient duration 1103, the total power delivered to the load increases by 25%. The efficiency of this zero voltage switching circuit increases to 90% and less than 1% of the power supplied by the AC mains is dissipated in MOSFET 505.

Figure 10:
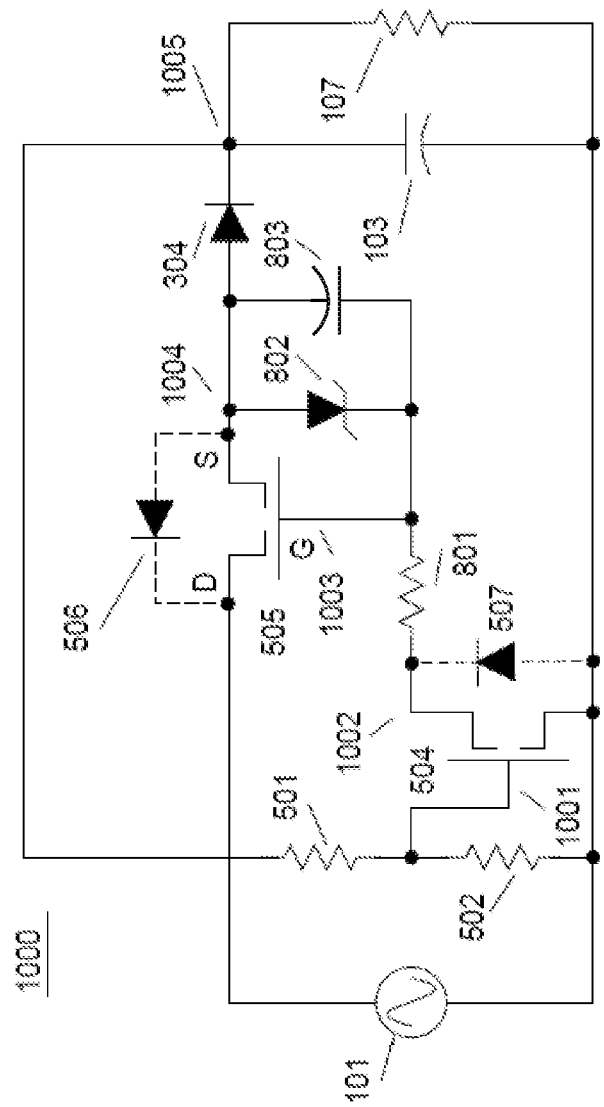
FIG. 10 is a schematic diagram of an alternative embodiment of the zero voltage switching circuit using MOS field-effect transistors.
Figure 11A:
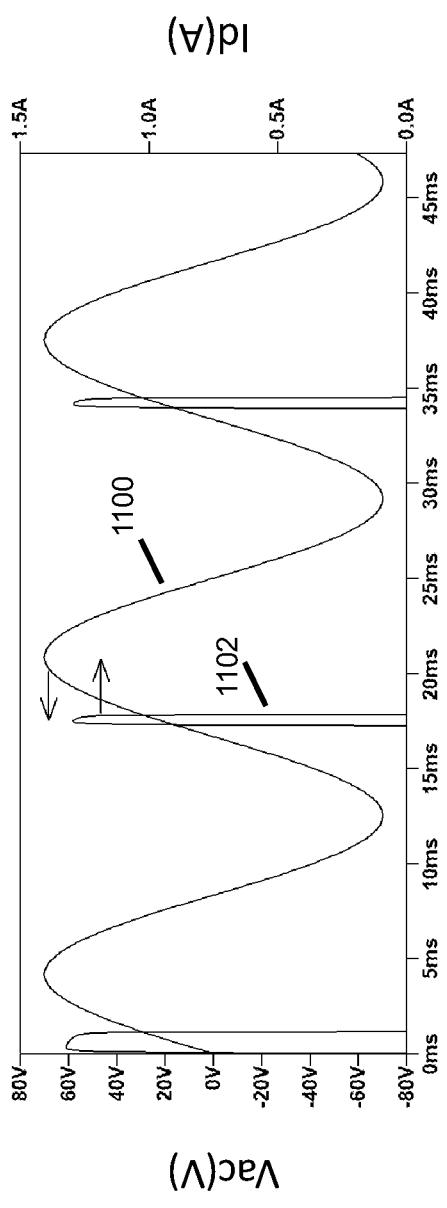
FIG. 11A shows the AC mains voltage waveform and the drain current waveform for the MOSFET switch in FIG. 10 during circuit start-up produced by a circuit simulation program.
Figure 11B:
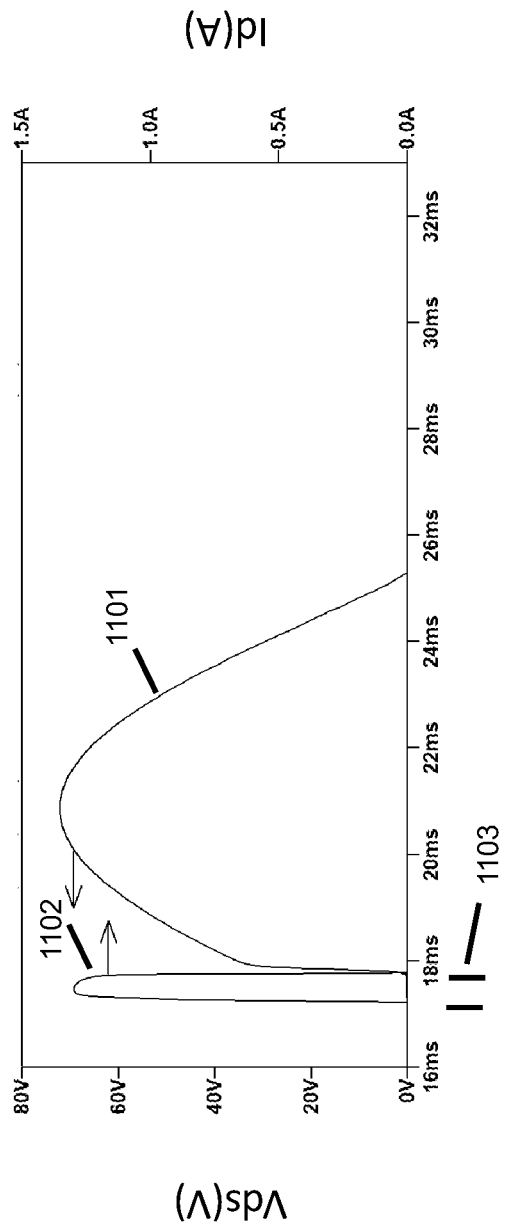
FIG. 11B shows drain-to-source voltage and drain current waveforms for the MOSFET switch in FIG. 10 in the steady state produced by a circuit simulation program.

FIG. 10 shows a first embodiment 1000 of the zero voltage switching circuit of FIG. 8 now including bias resistor 501 connected between the DC output node 1005 and the gate 1001 of MOSFET 504.

The first embodiment includes: An AC to DC conversion system (1000) for providing energy from an alternating current (AC) power source (101) in a direct current (DC) to an electronic load (107) at an output node (1005) comprising:
  a. a voltage divider (501, 502) connected across the load (107), and,
  b. a first switch (504), having an input (1001) and an output (1002), connected through its input (1001) to the voltage divider, and,
  c. a second switch (505), having an input (1003) and an output (1004), whose input (1003) is connected to the output (1002) of the first switch (504), and,
  d. a storage capacitor (103) connected through a diode (304) to the output (1004) of the second switch (505), and,
  e. f. a Zener diode (802), having a Zener voltage, connected between the input (1003) and output (1004) of the second switch (505), thereby clamping a voltage between the input (1003) and the output (1004) of the second switch (505) to the Zener voltage of the Zener diode (802), and,
  g. the electronic load (107) connected to the storage capacitor (103).

In a first embodiment, as shown in FIG. 10, the switches 504, 505, are N-MOSFET transistors. In another embodiment, functionally equivalent to FIG. 10, but not shown, the switches 504, 505 are bipolar transistors.

Figure 12:
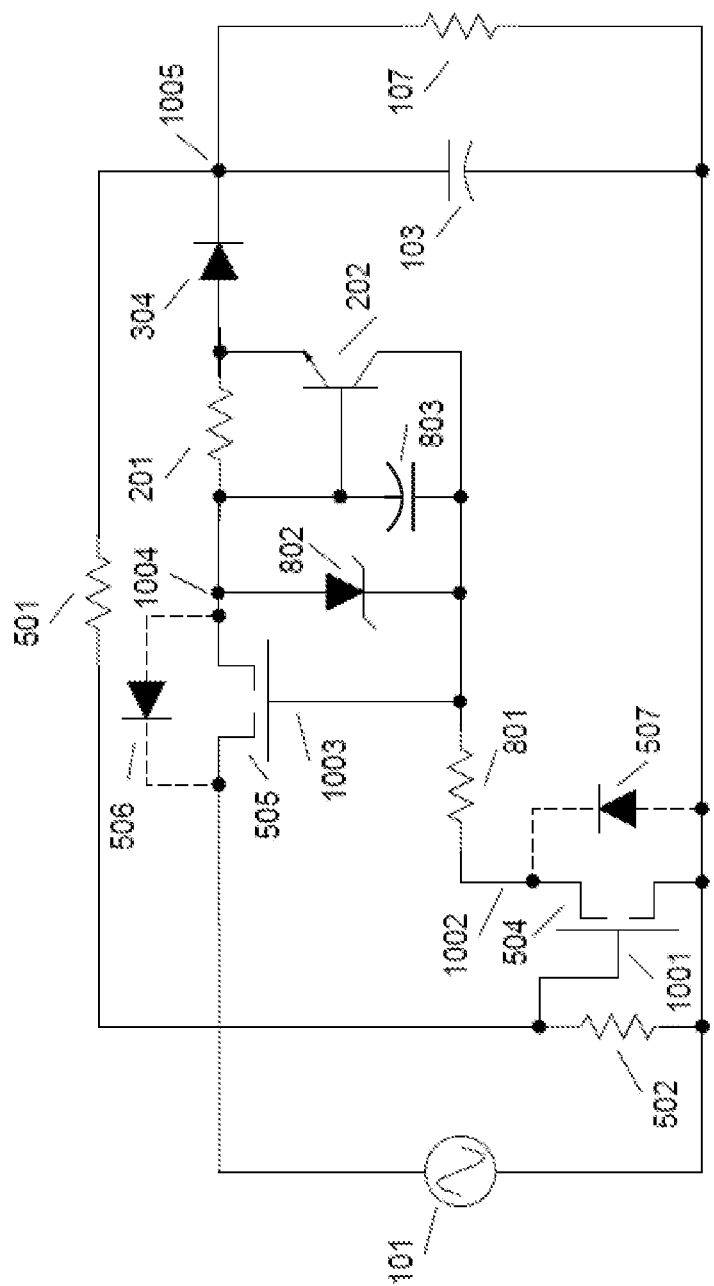
FIG. 12 is a schematic diagram of a preferred embodiment of the zero voltage switching circuit of FIG. 8 including output current limiting and negative feedback stabilization of the output voltage.

In another embodiment shown in FIG. 12, the AC to DC converter includes an overcurrent protection circuit interposed between the output 1004 of MOSFET switch 505 and the input of diode 304. The protection circuit consists of a series resistor 201 having a very small value and a bipolar transistor 202 wherein the base terminal is connected to switch output 1004, the emitter terminal is connected to the input of diode 304, and the collector is connected to the input 1003 of MOSFET switch 505.

Figure 13:
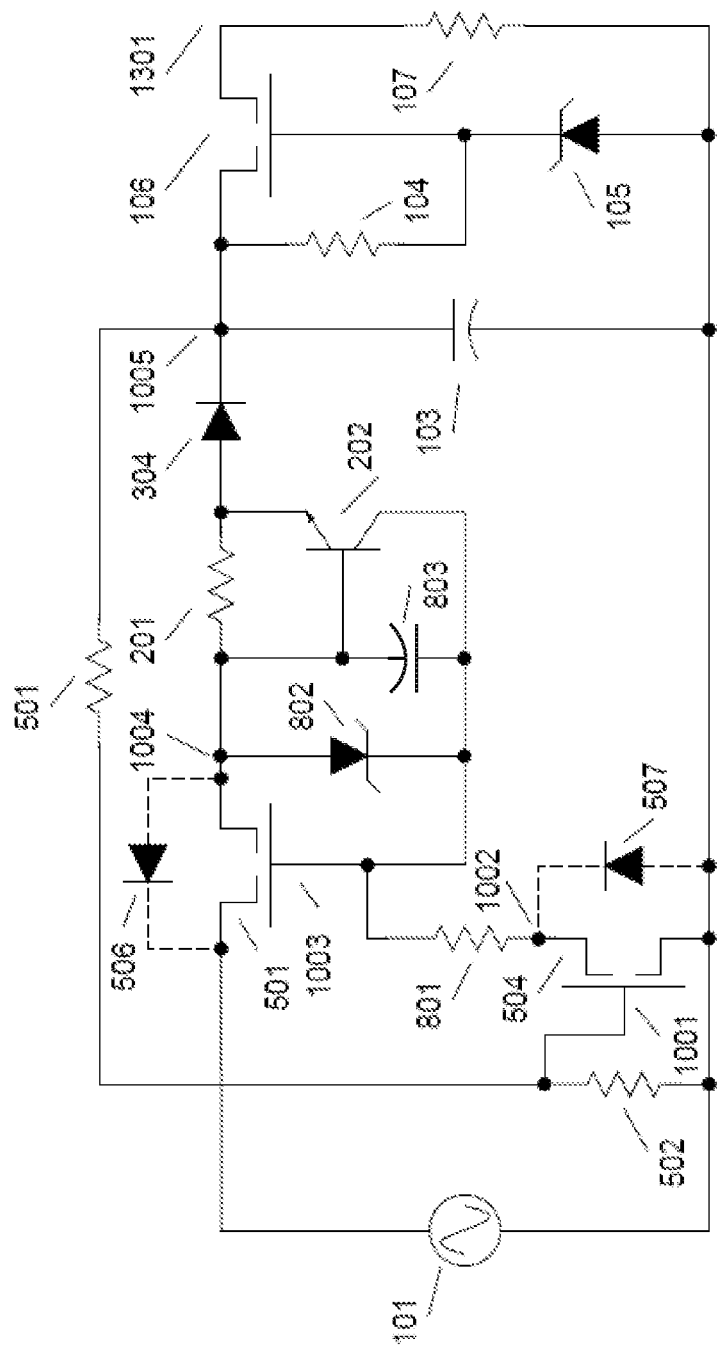
FIG. 13 is a schematic diagram of a preferred embodiment of the zero voltage switching circuit of FIG. 10 including output current limiting, output voltage regulation and negative feedback stabilization of the output voltage.

In further embodiment shown in FIG. 13, the AC to DC converter includes the regulation circuit having elements 104, 105, 106 interposed between the former output terminal 1005 and the load 107 at the new DC output terminal 1301.

Figure 14:
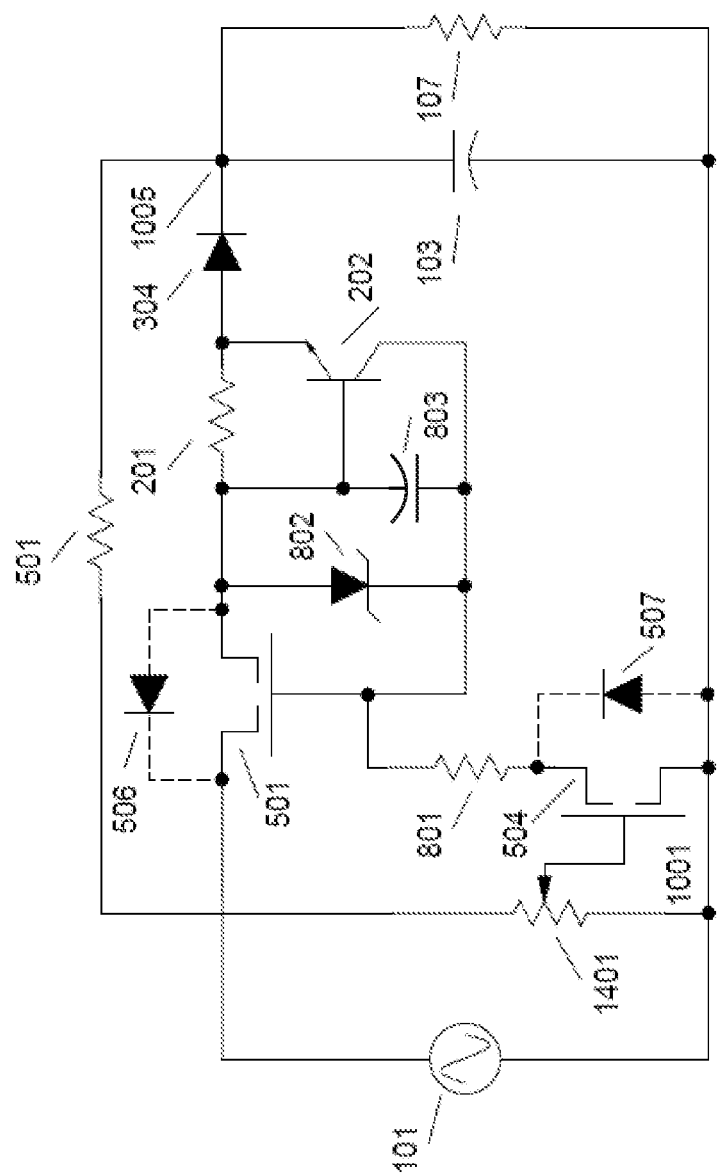
FIG. 14 is a schematic diagram of the zero voltage switching circuit of FIG. 13 in which the output voltage is manually adjustable.

FIG. 14 is a schematic diagram of an embodiment of the zero voltage switching circuit using MOSFETs in which the output voltage at the output terminal 1005 is manually adjustable. Resistor 502 in FIG. 12 is replaced with potentiometer 1401 which can be manually adjusted to change the voltage waveform applied to the gate 1001 of MOSFET 504, thereby changing the voltage stored on capacitor 103.

Figure 15:
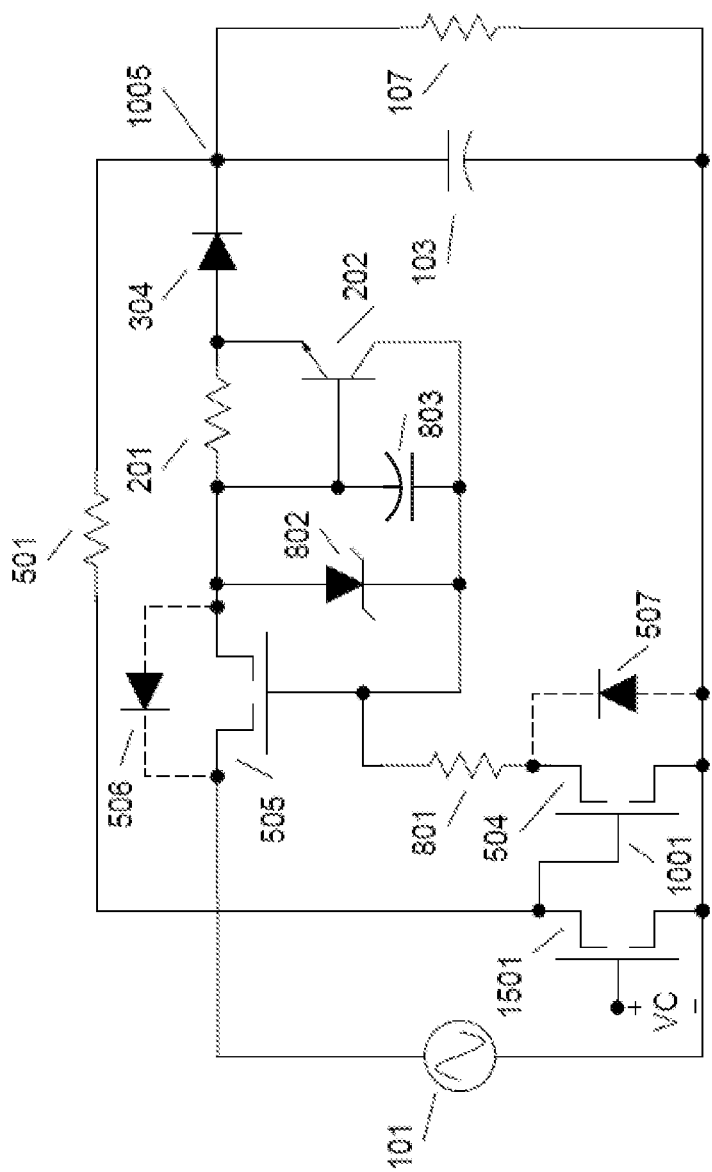
FIG. 15 is a schematic diagram of the zero voltage switching circuit of FIG. 13 in which the output voltage is electronically adjustable.

FIG. 15 is a schematic diagram of an embodiment of the zero voltage switching circuit using MOSFETs in which the output voltage of the AC to DC converter at the output 1005 is electronically adjustable. Additional control MOSFET 1501 is connected in place of resistor 502 in FIG. 12 and an external DC control voltage, Vc, is applied to the gate of MOSFET 1501, thereby changing the voltage applied to the gate 1001 of MOSFET 504 and changing the voltage stored on capacitor 103.

Figure 16:
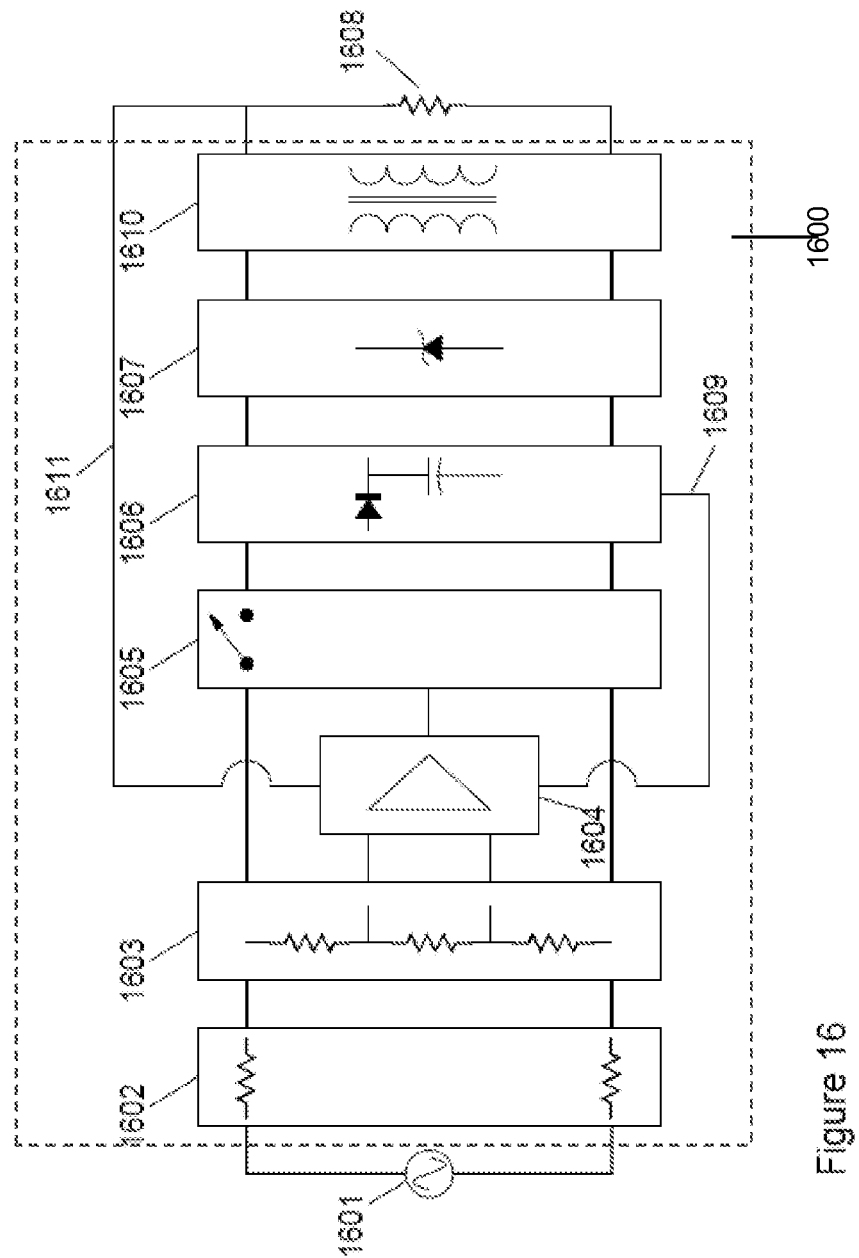
FIG. 16 is a block diagram of a third embodiment of the zero voltage switching circuit.
Figure 17:
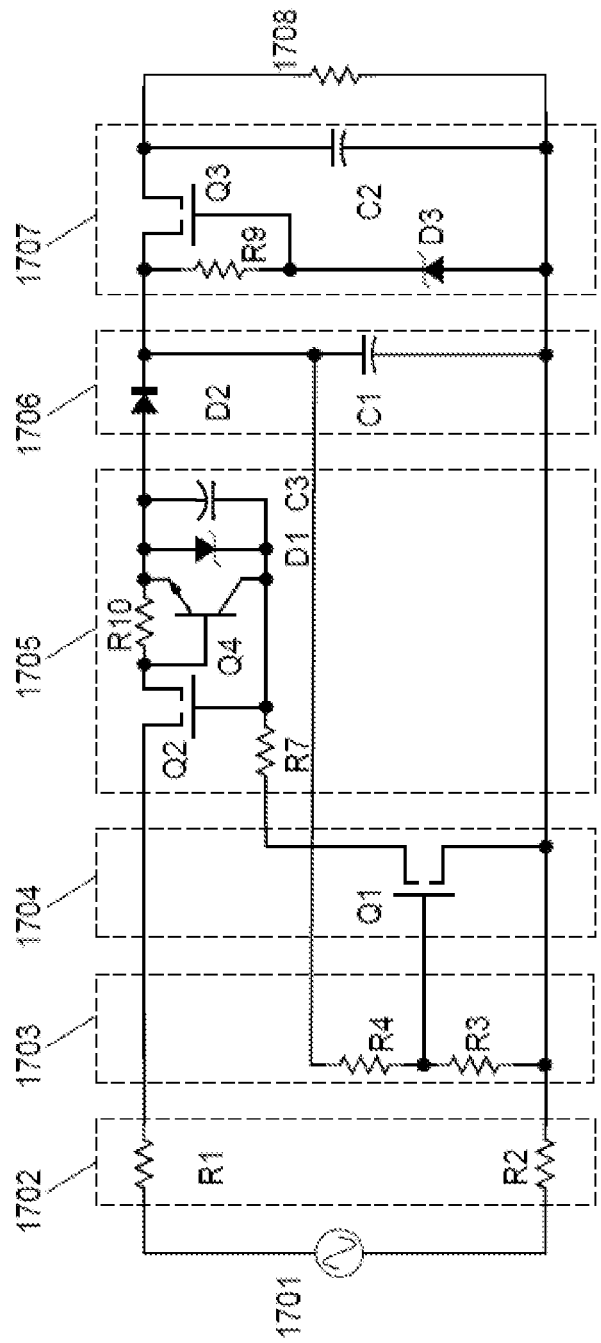
FIG. 17 is a schematic diagram of the embodiment of FIG. 16.

In another embodiment the AC to DC converter 1600 is comprised, generally, of the elements shown in FIG. 16 and the method implied by these elements. A non-limiting specific example of the circuit elements is shown in FIG. 17. Referring to FIG. 16 the AC source 1601 is connected to an inrush protection element 1602. In one embodiment the inrush element is comprised of resistor elements in the line and neutral of the AC supply. In another embodiment, where higher power and efficiency is required the inrush protection includes switch elements that provide high resistance at startup and switch the resistor elements out of the circuit at steady state operation. After the inrush protection, a scaled replica of the AC source 1601 waveform is formed for control purposes using a sampling element 1603. In one embodiment the sampling element 1603 includes resistors configured into a voltage divider network. One embodiment is the voltage divider as shown and discussed in FIG. 5. In another embodiment the sampling element includes a reference voltage source and comparator as shown in FIG. 4. In another embodiment the sampling element 1603 can be manually adjusted as shown in FIG. 14. In another embodiment the sampling element can be electronically adjusted as shown in FIG. 15. The sampled voltages are used as input to a switch driver element 1604. In the preferred embodiment, the switch driver element 1604 receives a feedback voltage signal 1609 from the storage element 1606 and based upon the voltage signal, controls the voltage applied to the gate of a switching element in the control switch and clamp element 1605, thereby opening and closing the control switch 1605 to supply power to the storage element 1606 and ultimately the load 1608. In one embodiment, where the feedback 1609 is removed, the AC to DC converter is a feed forward converter where charging of the storage element 1606 is controlled from the forward side 1603, 1604 and 1605. Addition of the feedback control 1609 provides a means for both feed forward and feedback control. In one embodiment the balance of feed forward and feedback control is determined by the selection of components in the voltage sampling element 1603 and the feedback line 1609. In one embodiment the balance of feedforward and feedback control is determined by resistor elements in the sampling element 1603 and the feedback 1609.

In another embodiment variable elements are used such that the feedforward and feedback control can be adjusted. In a preferred embodiment the switch driver 1604 is comprised of a voltage divider and a switch. The switch, current limit and clamp element 1605 controlled by the switch driver 1604 provides pulsed power at a fixed maximum current to the storage element 1606. In the preferred embodiment the switch, current limit and clamp element 1605 comprises an N-MOSFET, a current sensing resistor and a bipolar peak current limiting transistor, and a Zener diode, connected source to gate that clamps the peak gate-to-source voltage on the negative half-cycle of the AC source 1601, thereby providing the zero voltage switching feature of this circuit. Power from the switch and clamp element comprised of pre-selected peak current pulse is provided to a storage element 1606. In one embodiment voltage on the storage element 1606, comprised of a capacitor used as an energy storage element and a diode, is fed back 1609 through a voltage divider circuit to the switch driver 1604 thereby maintaining a constant charge on the capacitor. Output from the the storage element is fed through a voltage regulator 1607 to the load 1608. In another embodiment the AC to DC converter further includes a galvanic isolation element 1610. In another embodiment the AC to DC converter further includes elements 1611 that enable feedback from the load 1608. In the preferred embodiment the feedback circuit 1611 also includes galvanic isolation between the control element 1604 and the load 1608.

FIG. 17 shows the preferred embodiment of the zero voltage switching AC to DC converter. The individual components of the circuitry work much as the components of the circuitry already described in FIGS. 5-15. Elements 1701 through 1708 correspond to elements 1601 to 1608 of FIG. 16 respectively. The AC source 1701 is connected to the inrush protection circuit 1702 comprised in this preferred embodiment of resistors R1 and R2. In another embodiment (not shown) the inrush protection includes switches such that the current flows through the resistors R1 and R2 at startup and bypasses the resistors once steady state operation is reached. In another embodiment the inrush control uses inductors; that is elements R1 and R2 are replaced with inductors L1 and L2. Output from the inrush protection goes to the switch Q2 of the switch, current limit and clamp circuit 1705 and to the voltage sampling element 1703. The voltage sampling element 1703 is comprised of resistors R3, R4, sampling the voltage from storage capacitor C1. The values of R3, R4 are selected such that the voltage to the gate of switch Q1 in the switch driver element 1704 turns switch Q1 on and off and thereby synchronously turns switch Q2 off and on thereby providing a preselected timed output pulse from switch Q2 to charge storage element C1. Resistor R4 provides a feedback path as to the charge on capacitor C1 and therefore the output voltage to the voltage sampling circuit 1703 and therefore to the control circuit 1704. The switch, current limit and clamp element 1705 is comprised of switch Q2, current sense resistor R10 and bipolar transistor Q4, Zener Diode D1, capacitor C3 and resistor R7. The switch Q2 is controlled by the switch driver circuitry 1704. The peak output current of switch Q2 is limited to a preselected maximum value based upon the selected value of the current sense resistor R10. Capacitor C3 is charged to the Zener voltage of diode D1 on the negative half-cycle of the AC source 1701 and provides the gate-to-source bias on Q2 that minimizes the drain-to-source voltage of Q2 during the charging current transient. This pulsed output from the switch Q2 is connected to the voltage regulator 1706 which through the feedback of R4 to the voltage sampling 1703 and the switch driver 1704 holds storage capacitor C1 to a constant charge. Control element switch Q1 and therefore supply switch Q2 are activated, either opened or closed, in synch with the AC input 1701. The AC to DC converter provides a low voltage output with pulse modulation at the frequency of the incoming AC source. The switches are activated, either opened or closed, at voltages that are near, within the threshold values for the components Q1 and Q2, of the zero crossing of the AC source. The Output then goes to voltage regulator 1707 and then load 1708. The voltage regulator 1707 includes switch Q3, Zener diode D3 resistor R9 and capacitor C2. Circuit components D3, Q3, R9 function as a voltage regulator equivalently to that already described for circuit elements 105, 104, 106 respectively in FIG. 1. Capacitor C2 provides storage capacity to buffer and thereby smooth the output from the AC to DC converter to the load 1708.

The AC to DC converter in the preferred embodiment of FIGS. 16 and 17 is comprised of elements of inrush protection 1602, voltage sampling 1603, a switch driver 1604, a switch and clamp 1605, a storage element 1606 and a voltage regulator 1607. Selection of components in the voltage sampling 1603 determine the timing of the switch driver 1604. Selection of elements in the switch and clamp determine a peak voltage and current for out pulses. Power output is controlled by selection of both the peak current and the pulse timing. Feedback from the storage element through the voltage sampling is used to select the pulse timing. The AC to DC converter operates in sync with the AC source.

The preferred embodiment of FIGS. 16 and 17 include in general a voltage divider 1603 connected to the power source 1601, and, a first switch 1604 connected through its input to the voltage divider, and, a second switch 1605 whose input is connected to the output of the first switch, and, a storage capacitor C1 connected through a diode to the output of the second switch, and, a sense resistor connected 1609 between the storage capacitor and the voltage divider thereby providing feedback control of the zero voltage switching AC direct to DC extraction conversion system, and, a Zener diode D1 connected between the input and output of the second switch, and, the electronic load 1608 connected to the storage capacitor C1. The switches 1604, 1605 may be any electronically actuated switch. In one embodiment the switches are N-MOSFETs. In another embodiment the switches are bipolar transistors and in another embodiment the switches are microelectromechanical switches.

Figure 18:
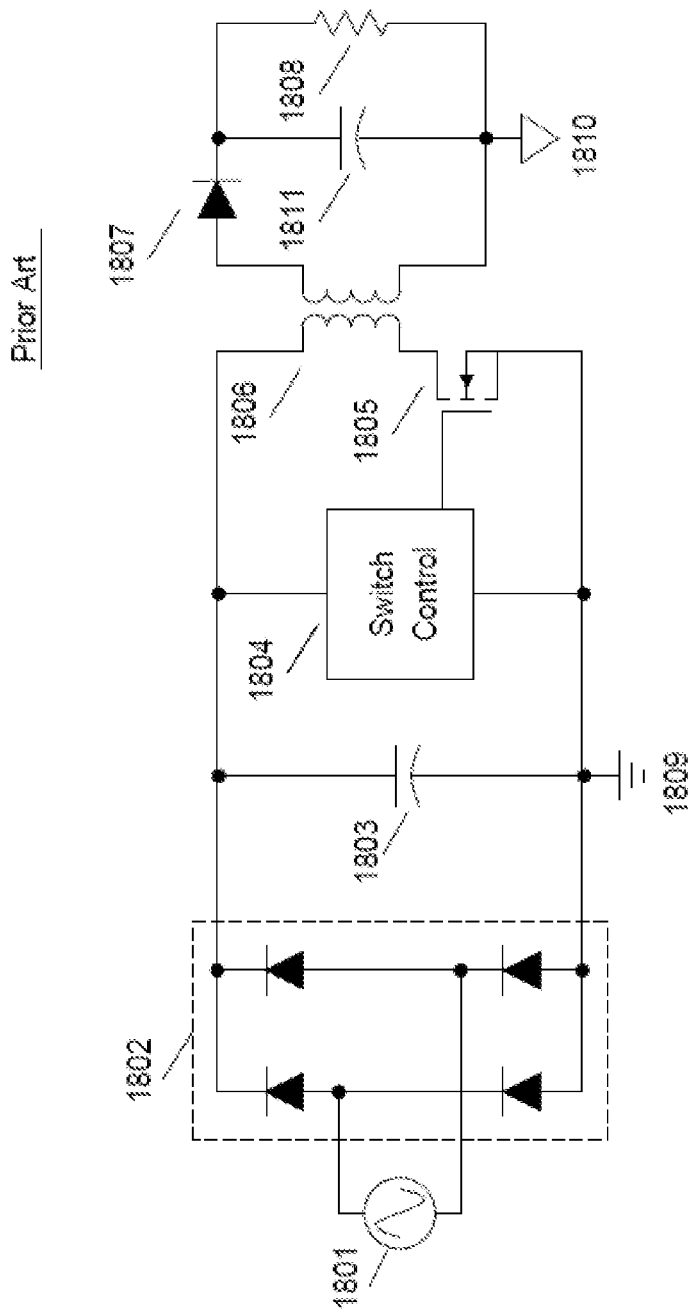
FIG. 18 shows prior art for an AC to DC converter that includes isolation of the load from the source.

FIG. 18 shows a prior art AC to DC converter system that includes Galvanic isolation of the AC source 1808 from the load. The typical prior art AC to DC converter includes full wave rectification 1802 that provides a grounded 1809 DC source that is filtered 1803 includes a controller 1804 that is typically a pulse controller that uses a switch 1805 to control the output through a transformer 1806 thereby providing DC voltage to the load 1808. A Diode 1807 prevents flow of current from the load back through the transformer 1806. Typically, the transformer also acts as a step down transformer to control the voltage required by the load 1808. Note that the high side of the transformer 1806 operates at the rectified voltage of the AC source 1801. Although the transformer does provide galvanic isolation the high voltage connected to the transformer thereby requires a transformer that can operate with this high voltage.

Figure 19:
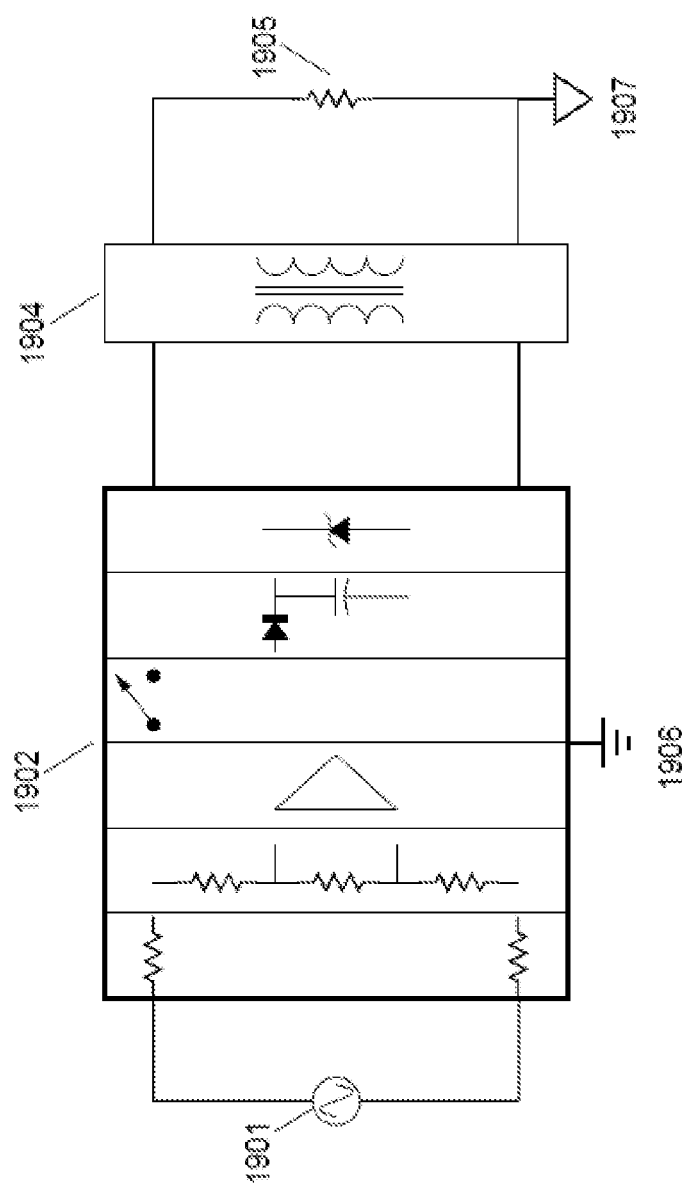
FIG. 19 shows an embodiment of an AC to DC converter of the present invention that includes isolation of the load from the source.

By contrast the power supply of the instant invention is shown in a first embodiment of FIG. 19. The AC source 1901 is connected through the AC to DC converter 1902 through an isolation device 1904 to the load 1905. The ground 1906 on the AC to DC converter 1902 is not necessarily at the same level as the ground 1907 on the load 1905. In a preferred embodiment the AC to DC converter 1902 is as described in FIGS. 12 and 13. The AC to DC converter 1902 includes clamping of the output voltage supplied to a storage capacitor (C1 of FIG. 13) such that the isolation device 1904 sees at most the clamped voltage. In a preferred embodiment and comparison of FIGS. 16 and 19 the isolation device is located between block elements 1607 and 1608.

Figure 20:
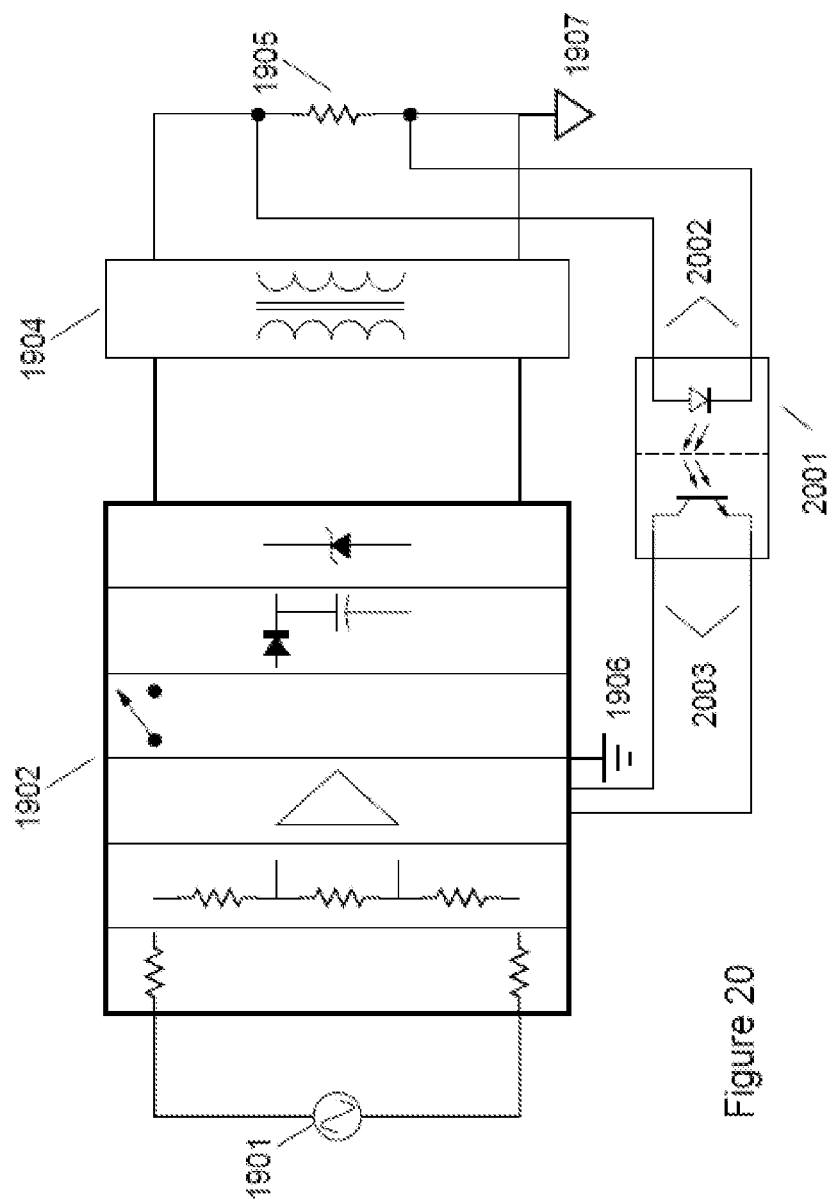
FIG. 20 shows an embodiment of an AC to DC converter of the present invention that includes isolation of the load from the source and further includes feedback control from the load to the AC to DC converter.

Another embodiment, shown in FIG. 20, further includes feedback from the load 1905 to the AC to DC converter 1902. The feedback is provided through sense lines 2002 that pass through an isolator 2001 and through the isolated sense lines 2003, to the AC to DC converter. In one embodiment one of the sense lines 2003 is grounded and the other feeds into the voltage sampling circuit 1303 much as the sense line shown in FIG. 17 feeds from capacitor C1 through resistor R8. In one embodiment the isolator 2001 is an optical isolator as shown in the figure. In another embodiment (not shown) a transformer is used for the isolator in place of the optical isolator.

FIGS. 16, 17, 19 and 20 show an AC to DC converter that may be fully integrated on silicon. Not all of the components shown in the figures are required for a fully functional device. In one embodiment, the AC to DC converter consists of a voltage divider (1703) connected to and sampling the AC source 1701 and further connected to the base of first switch transistor, Q1. The values of the resistor in the voltage divider control the voltage seen by Q1 and thereby provide fed forward control of Q1 and therefore the output of the AC to DC converter. The drain of Q1 is in turn connected to the base of a second switch transistor, Q2 which supplies pulsed current to a storage device C1. A diode D2 prevents discharge of the capacitor C1 back through the switch Q2. A sense line is connected from the storage element C1 through a resistor R8 into the voltage divider 1703 and provides feedback control to prevent full discharge of the storage capacitor C1. A Zener diode D1 connected between gate and source of Q2 clamps the gate-to-source voltage seen by Q2 to the Zener voltage of the diode D1, which bias voltage is stored on capacitor C3. An inductor or low resistance wire wound resistor R1 in series in the AC line, filters transients and limits current seen by Q2. Therefore, a fully functional AC to DC converters is seen to consist of a voltage divider, two switches, a storage device, a Zener diode, a regular diode, and an inductor, wherein the switches are N-MOSFETs and the storage device is a capacitor. In another embodiment the AC to DC converter further includes inrush control 1702. In one embodiment the inrush control consists of a resistor connected in series in the line and neutral of the AC source. In another embodiment the AC to DC converter further consists of a voltage regulator. In one embodiment the voltage regulator consists of a switch Q3 connected in output line from the storage device C1. The switch is controlled through a Zener diode D3 connected to its base from a capacitor C2. The output of the voltage regulator is connected to the load 1708. In another embodiment the AC to DC converter further incudes galvanic isolation, wherein the galvanic isolation is an isolation transformer connected to the output of the voltage regulator. In another embodiment there is no voltage regulator and the isolation transformer is connected between the storage capacitor C2 and the load 1708. Another embodiment further includes feedback from the load to the voltage divider 1703. The feedback from the load is fed through a second isolation device 2001 to the voltage divider 1703.

SUMMARY

An AC to DC conversion system is described. The conversion system consists of an electronic switch and control circuitry employed to provide controlled pulsed power to a storage device that provides power to a load at either a preselected or manually or automatic selectable voltages while ensuring the voltage drop across the switch is minimized to reduce power dissipated through the switch itself, thereby significantly increasing the efficiency and reducing thermal losses. The AC to DC converter in one minimal version consists of a pair of N-MOSFET transistors, a voltage divider, a storage element and a pair of diodes. The design enables high efficiency with minimal components that may be fully integrated onto silicon.

I claim:

1. An AC to DC conversion system for providing energy from an alternating current (AC) power source (101) in a direct current (DC) to an electronic load (107) at an output node (1005) comprising:
   a. a voltage divider (501, 502) connected across the load (107), and,
   b. a first switch (504), having an input (1001) and an output (1002), connected through its input (1001) to the voltage divider, and,
   c. a second switch (505), having an input (1003) and an output (1004), whose input (1003) is connected to the output (1002) of the first switch (504) through a current limiting resistor (801), and,
   d. a storage capacitor (103) connected through a diode (304) to the output (1004) of the second switch (505), and,
   e. a Zener diode (802), having a Zener voltage, connected between the input (1003) and output (1004) of the second switch (505) and a shunt capacitor (803) connected in parallel to the Zener diode (802) thereby clamping a voltage between the input (1003) and the output (1004) of the second switch (505) to the Zener voltage of the Zener diode (802), and,
   f. the electronic load (107) connected to the storage capacitor (103).

2. The AC to DC conversion system of claim 1 further comprising a series voltage regulator circuit interposed between the storage capacitor (103) and the electronic load (107), the series voltage regulator circuit comprising a pass transistor (106) having a characteristic threshold voltage ($V_T$) connected to the load (107) and a bias resistor (104) connected across the pass transistor, and, a Zener Diode having a Zener voltage ($V_Z$) connected to the bias resistor such that an output voltage to the load is maintained at $V_Z$-$V_T$.

3. The AC to DC conversion system of claim 1 further comprising current limiting electronic circuitry interposed between the electronic switch and the energy storage element to limit the current flowing through the second semiconductor switch, the current limiting circuitry including a sense resistor (201) connected to the output of the second switch and the load (107) and a bipolar transistor (202) connected between the load and the input of the second switch.

4. The AC to DC conversion system of claim 3 wherein all semiconductor devices are fabricated on a single integrated circuit chip.

5. The AC to DC conversion system of claim 3 further including an isolation transformer between the storage capacitor and the electronic load.

6. The AC to DC conversion system of claim 3 further including sense lines from the load passing through an isolator to the voltage divider thereby providing feedback control from the load.

7. The AC to DC conversion system of claim 1 wherein the first switch and the second switch are both N-MOSFETs.

8. The AC to DC conversion system of claim 1 wherein the first switch and the second switch are both bipolar transistors.

9. The AC to DC conversion system of claim 1 wherein all semiconductor devices are fabricated on a single integrated circuit chip.

10. The AC to DC conversion system of claim 1 wherein the voltage divider further includes a potentiometer (1401) such that an input voltage to the first switch is manually adjusted.

11. The AC to DC conversion system of claim 1 wherein the voltage divider further includes a control MOSFET (1501) connected in place of a resistor of the voltage divider and an external DC control voltage, applied to the input of the control MOSFET (1501), thereby changing the voltage applied to the input of the first switch and changing the voltage stored on storage capacitor.

12. The AC to DC conversion system of claim 11 wherein all semiconductor devices are fabricated on a single integrated circuit chip.

13. The AC to DC conversion system of claim 1 further including an isolation transformer between the storage capacitor and the electronic load.

14. The AC to DC conversion system of claim 1 further including sense lines from the load passing through an isolator to the voltage divider thereby providing feedback control from the load.

* * * * *